United States Patent
Rauch et al.

(10) Patent No.: US 7,574,797 B2
(45) Date of Patent: Aug. 18, 2009

(54) THROTTLE BODY AND METHOD OF ASSEMBLY

(75) Inventors: James Rauch, Grass Lake, MI (US); Richard Tyzo, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 578 days.

(21) Appl. No.: 11/384,065

(22) Filed: Mar. 17, 2006

(65) Prior Publication Data

US 2006/0157663 A1 Jul. 20, 2006

Related U.S. Application Data

(63) Continuation-in-part of application No. 10/898,493, filed on Jul. 22, 2004, now Pat. No. 7,032,885.

(51) Int. Cl.
*B21K 1/20* (2006.01)

(52) U.S. Cl. .............................. 29/890.123; 29/890.13; 29/890.132; 72/357; 72/370.16; 251/308

(58) Field of Classification Search ................. 251/305, 251/308; 464/179; 137/15.17, 15.25; 123/337; 29/890.123, 890.13, 890.132; 72/356, 357, 72/360, 370.16
See application file for complete search history.

(56) References Cited

U.S. PATENT DOCUMENTS

| | | | |
|---|---|---|---|
| 2,581,774 A * | 1/1952 | Stone et al. ............ | 29/890.123 |
| 2,704,681 A | 3/1955 | Fischer | |
| 3,262,671 A | 7/1966 | Muench | |
| 3,391,954 A | 7/1968 | Callahan | |
| 3,471,121 A | 10/1969 | Geiselman | |
| 3,730,641 A | 5/1973 | Gordon | |
| 3,838,928 A | 10/1974 | Blaurock et al. | |
| 4,022,424 A | 5/1977 | Davis et al. | |
| 4,195,944 A | 4/1980 | Cross | |
| 4,275,867 A | 6/1981 | Schils | |
| 4,462,567 A | 7/1984 | Habicht | |
| 4,508,068 A | 4/1985 | Tuggle et al. | |
| 4,509,720 A | 4/1985 | Griffin et al. | |
| 4,603,886 A | 8/1986 | Palini, Jr. | |
| 4,611,837 A | 9/1986 | Aleck | |
| 4,651,763 A | 3/1987 | Scobie et al. | |
| 4,660,996 A * | 4/1987 | Marshall ................. | 384/138 |
| 4,790,683 A | 12/1988 | Cramer, Jr. et al. | |
| 4,828,423 A | 5/1989 | Cramer, Jr. et al. | |
| 4,838,062 A * | 6/1989 | Prenn ....................... | 72/41 |
| 4,860,706 A | 8/1989 | Suzuki et al. | |
| 4,881,842 A | 11/1989 | Farrell et al. | |
| 4,938,452 A * | 7/1990 | Imamura et al. ........ | 251/305 |
| 5,121,605 A | 6/1992 | Oda et al. | |
| 5,176,413 A | 1/1993 | Westman | |
| 5,188,078 A | 2/1993 | Tamaki | |
| 5,311,662 A * | 5/1994 | Losser ................. | 29/890.124 |

(Continued)

*Primary Examiner*—John Bastianelli
(74) *Attorney, Agent, or Firm*—Greg P. Brown; MacMillan, Sobanski & Todd LLC

(57) ABSTRACT

A throttle body for an automobile includes a throttle shaft defining a rotational axis. The throttle shaft includes deformable members integrally formed about an exterior surface of the throttle shaft. A housing includes a bore. The throttle shaft extends through the bore with the deformable member partially-located within the bore. A bearing includes an inner surface and an outer surface. The bearing inner surface forms a press-fit connection with the deformable members to substantially prevent movement between the throttle shaft and the bearing in a direction parallel to the rotational axis.

4 Claims, 7 Drawing Sheets

U.S. PATENT DOCUMENTS

| | | | |
|---|---|---|---|
| 5,370,361 A | 12/1994 | Mendell et al. | |
| 5,421,718 A * | 6/1995 | Karlsson et al. | 425/577 |
| 5,493,887 A * | 2/1996 | Good et al. | 29/890.123 |
| 5,499,884 A | 3/1996 | Kuhnhold et al. | |
| 5,510,661 A * | 4/1996 | Yoshimura et al. | 310/90 |
| 5,522,361 A * | 6/1996 | Pickman et al. | 123/337 |
| 5,667,332 A | 9/1997 | Lindholm | |
| 5,822,984 A | 10/1998 | Part | |
| 5,853,017 A * | 12/1998 | Volz et al. | 29/890.13 |
| 5,894,753 A * | 4/1999 | Sachot et al. | 72/370.16 |
| 6,206,024 B1 | 3/2001 | Naberhaus | |
| 6,349,701 B1 | 2/2002 | Sakurai et al. | |
| 6,581,569 B2 | 6/2003 | Arsic et al. | |
| 6,691,678 B1 | 2/2004 | Hashimoto et al. | |
| 2003/0095728 A1 | 5/2003 | Dorulla et al. | |
| 2003/0126916 A1 | 7/2003 | Kure | |
| 2005/0097743 A1* | 5/2005 | Arai et al. | 29/890.12 |
| 2005/0188951 A1* | 9/2005 | Pringle | 251/305 |

\* cited by examiner

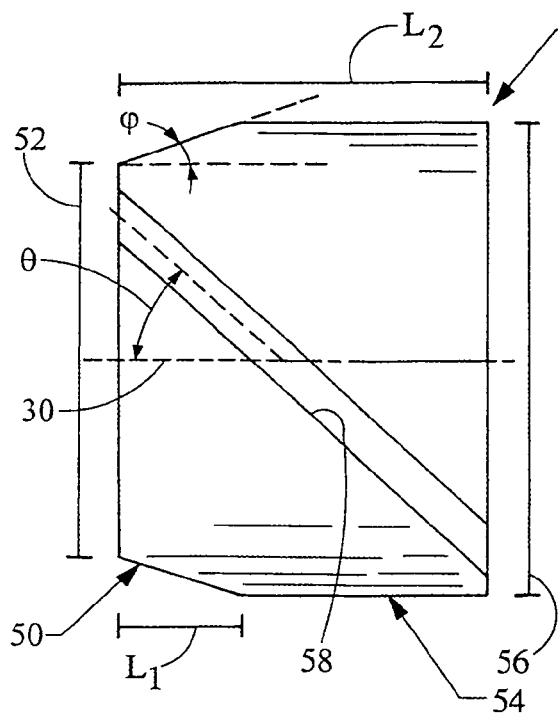 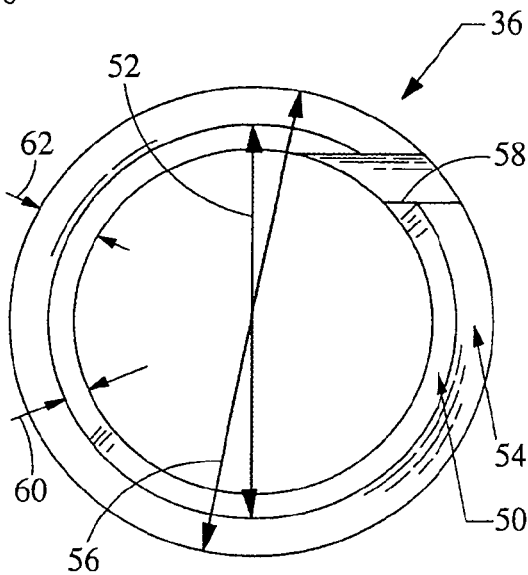
Fig. 3A   Fig. 3B
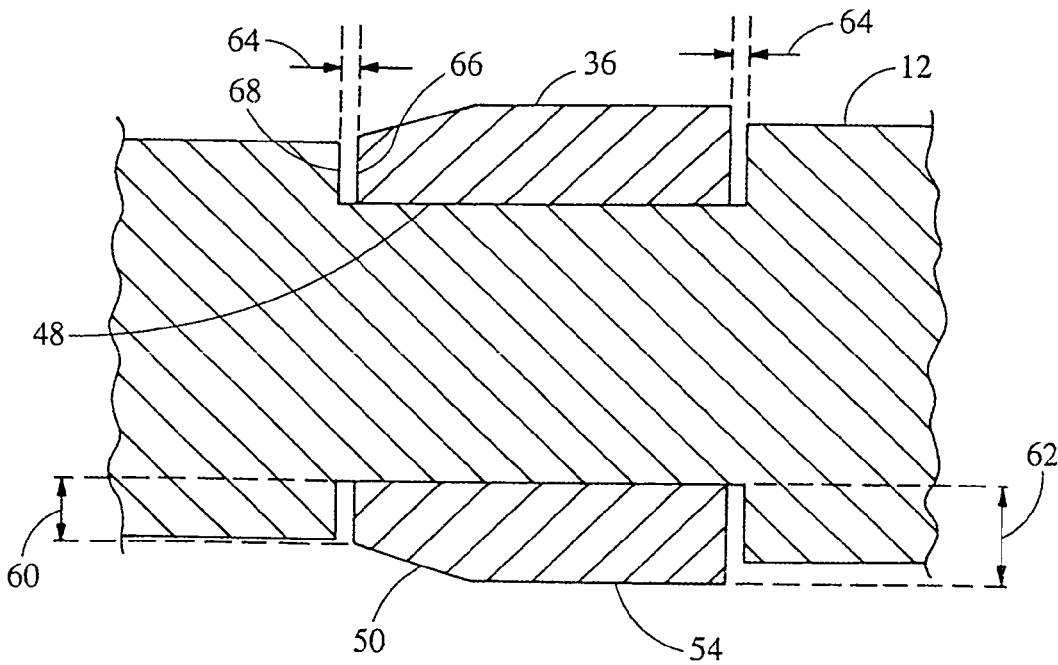
Fig. 4

THROTTLE BODY AND METHOD OF ASSEMBLY

CROSS-REFERENCE TO RELATED APPLICATIONS

The application is a continuation-in-part of U.S. application Ser. No. 10/898,493, filed Jul. 22, 2004 now U.S. Pat. No. 7,032,885.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention generally relates to an air intake control device. More specifically, the invention relates to a throttle body and a method of assembling a throttle body.

2. Description of the Related Art

Throttle bodies regulate the airflow to an internal combustion engine. In order to run properly, internal combustion engines require a precise mixture of air and gasoline and, therefore, throttle bodies are designed to adjustably control the airflow into the cylinders of the engine. In order to control the airflow that reaches the cylinders, the throttle body includes at least one throttle plate attached to a throttle shaft such that the throttle plate is located within a throttle bore, or proximal to an end of the throttle bore. With rotation of the shaft, the throttle plate is able to selectively obstruct airflow through the throttle bore. More specifically, the throttle plate is able to rotate with respect to the bore in order to adjust the cross-sectional area of the bore that is not obstructed by the plates (the "effective area"), thus controlling the amount of airflow that is permitted to flow through the throttle bore.

In order to effectively control the effective area, the throttle plate is sized and shaped to approximate the cross-sectional area of the bores so as to substantially or completely obstruct the bore when the throttle plate is perpendicular to the airflow (the "closed position"). Additionally, the throttle plate has a minimal thickness in order to substantially not obstruct the throttle bore when the plate is angled such that a throttle plate is not substantially perpendicular to the airflow (the "open position").

During operation, if the engine is idling, only a little air is needed to mix with the small amount of fuel being injected into the engine. When the engine is idling, the throttle plate is therefore in the closed position. Conversely, if the engine is operating at a speed higher than! idle, then more air is needed to mix with the increased amount of fuel being provided to the engine. At speeds higher than idle, the throttle plate is therefore in an open position of a varying angle with respect to the airflow, the angle varying within the air requirements.

In order to completely or substantially obstruct the bore when the throttle plate is the dosed position, it is desirable for the throttle plate to be precisely sized and accurately located within the bore.

Furthermore, it is desirable for the throttle plate to be secured in the direction parallel to the rotational axis of the throttle shaft (referred to as the longitudinal direction). This minimizes or prevents unwanted contact between the throttle plate and the bore inner surface. Contact between the throttle plate and the bore inner surface may prevent the throttle plate from fully closing. Furthermore, contact may cause excessive friction between moving parts and premature part failure. The control of the longitudinal movement of the throttle plate is hereinafter referred to as float control.

In order to improve float control, some currently-used throttle bodies include a first press-fit connection between the throttle shaft and an inner race of a bearing, and a second press-fit connection between the outer race of the bearing, and the throttle body housing. However, the first press-fit connection may deform the throttle shaft during periods of assembly or maintenance of the throttle body. Throttle shaft deformation is undesirable because it may prevent the throttle shaft from being reusable after assembly or maintenance, thus potentially increasing assembly and/or service costs.

Another float control method includes an assembly for longitudinally trapping the inner race of the bearing in a predetermined position on the throttle shaft. More specifically, the inner race is sandwiched between a first structure, such as a threaded nut, on a first longitudinal side of the bearing and a second structure, such as a stepped-diameter of the throttle shaft, on a second longitudinal side of the bearing. However, this type of float control construction may require complicated machining operations and part requirements.

Yet another float control method includes an clip located in a groove for longitudinally trapping the inner race of the bearing in a predetermined position on the throttle shaft. More specifically, the clip is seated in a groove such as to contact the bearing on a first longitudinal side and such that the second longitudinal side of the bearing contacts the housing. However, this type of float control construction may require complicated machining operations and may result in undesirable, high-frictional contacts between the respective structures and the bearing.

Therefore, it is desirous to minimize both the longitudinal movement of the throttle shaft and the friction between moving parts, all while reducing the manufacturing and assembly costs and complexities of the throttle body.

BRIEF SUMMARY OF THE INVENTION

In overcoming the disadvantages and drawbacks of the known technology, the current invention provides a throttle body for an automobile and a method of assembly of a throttle body. The throttle body includes a throttle shaft defining a rotational axis, a housing having a bore, a deformable member located on the throttle shaft and at least partially-located within the bore, and a bearing having an inner surface and an outer surface. The bearing inner surface forms a press-fit connection with the deformable member to substantially prevent movement, in a direction parallel to the rotational axis, between the throttle shaft and the bearing.

In one aspect of the present invention, a throttle body for an automobile includes a throttle shaft defining a rotational axis. The throttle shaft includes deformable members integrally formed about an exterior surface of the throttle shaft. A housing includes a bore. The throttle shaft extends through the bore with the deformable member partially-located within the bore. A bearing includes an inner surface and an outer surface. The bearing inner surface forms a press-fit connection with the deformable members to substantially prevent movement between the throttle shaft and the bearing in a direction parallel to the rotational axis.

In yet another aspect of the present invention, a method of assembly of a throttle body is also provided by the present invention. The method of assembly of a throttle body for an automobile includes providing a tubular member defining a rotational axis. Forming deformable members on the tubular member for forming a throttle shaft. Providing a housing having a bore. Extending at least a portion of the throttle shaft through the bore of the housing. Providing a bearing having an inner surface and an outer surface. Coupling the bearing inner surface with the deformable members to form a press-fit connection and to substantially prevent movement between the throttle shaft and the bearing in a direction parallel to the rotational axis.

In yet another aspect of the present invention, a method is provided for forming a throttle shaft for a throttle body of an automobile. The method includes providing a tubular member that defines a rotational axis. Providing a forming tool having a split die having a plurality of contact points and uncompressed regions. Inserting the tubular member in the forming tool. Compressing the forming tool against the tubular member for displacing material to the uncompressed regions for forming a plurality of protruding splines.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3a is a side view of the deformable member of FIG. 1 according to the first preferred embodiment of the present invention.

FIG. 3b is an axial view of the deformable member of FIG. 3a.

FIG. 4 is a partial view of the deformable member on the throttle shaft according to the first preferred embodiment of the present invention.

DETAILED DESCRIPTION OF THE PREFERRED EMBODIMENT

Figure 1:
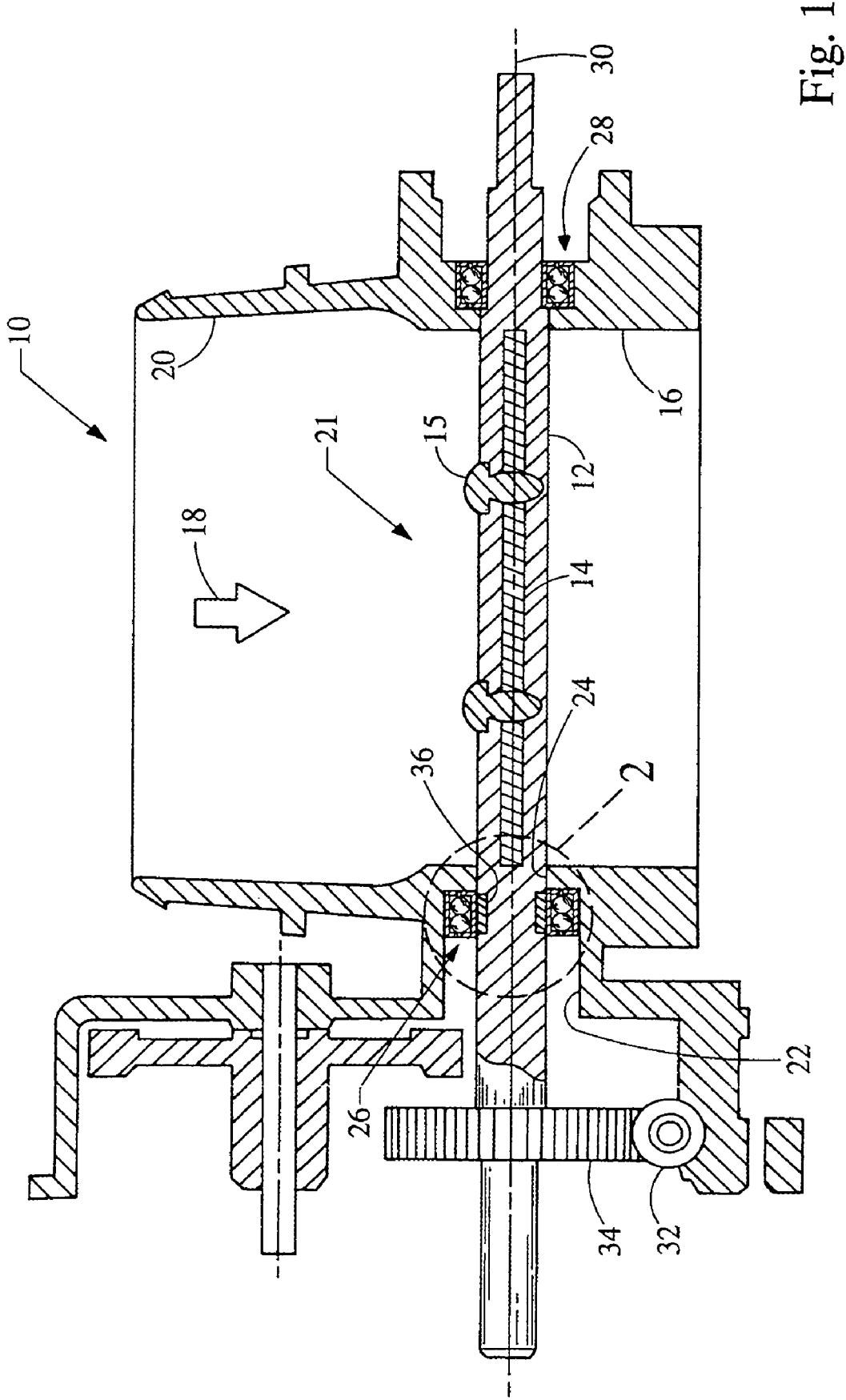
FIG. 1 shows a throttle body embodying the principles of the present invention, including a throttle shaft and a pair of, bearings received within a housing, and a deformable member coupled with the throttle shaft and one of the bearings according to the first preferred embodiment of the present invention.

Referring now to the present invention, FIG. 1 shows a throttle body 10 used to control the airflow into the combustion cylinders of an internal combustion engine of a motor vehicle. The throttle body 10 includes a throttle shaft 12 connected to a throttle plate 14 by an appropriate means, such as threaded fasteners or rivets 15. The throttle shaft 12 and plate 14 are rotatably received within a housing 16 such that the throttle plate 14 is positioned within a bore 20 receiving the airflow 18. The throttle shaft 12 itself is extended between a pair of bores 24 formed in opposite sides of the airflow bore 20.

During operation of the throttle body 10, the airflow 18 enters the bore 20 which is partially or fully obstructed by the throttle plate 14 and/or throttle shaft 12. More specifically, the throttle plate 14 preferably has a size and shape placing its perimeter in close fit within that of the bore 20 in order to completely block the airflow 18 when the throttle plate 18 is in a closed position (where the axial faces of the throttle plate 14 are generally perpendicular to the airflow 18 through the bore 20, as shown in FIG. 1). As the throttle plate 14 is rotated with respect to the housing 16, openings (not shown) are formed between the perimeter of the throttle plate 14 and the bore 20, which permit the airflow 18 to flow past the throttle plate 14 and into the cylinders of the internal combustion engine. The amount of the airflow 18 that is permitted to flow past the throttle plate 14 increases as the throttle plate is rotated towards an open position (where the axial faces of the throttle plate 14 are not perpendicular to the airflow 18 and more and more closer to parallel within the airflow 18).

The throttle shaft 12 is rotatably received by the bores 24 of the housing 16. More specifically, a pair of bearings 26, 28 preferably receive the throttle shaft 12 on opposite sides of the housing 16 in order to permit the throttle shaft 12 to rotate about a rotational axis 30 defined longitudinally therethrough. The rotation of the throttle shaft 12 is preferably controlled by an automated mechanism, such as an actuator driving a drive gear 32 connected to the housing 16 and a driven gear connected or mounted to the throttle shaft 12.

Figure 2:
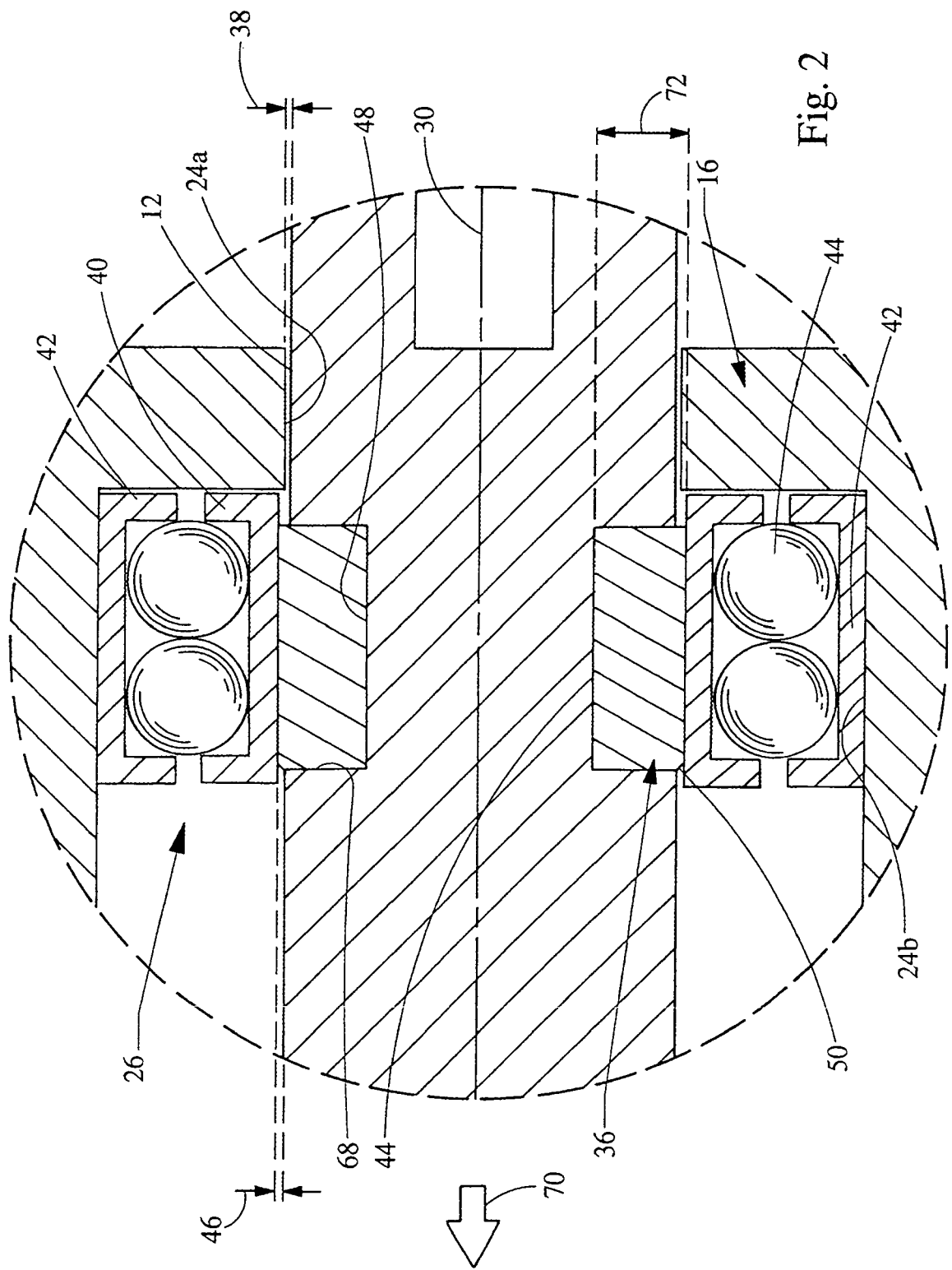
FIG. 2 is an enlarged view of the portion of the throttle body of FIG. 1 encircled by line 2-2.

Referring now to FIG. 2, the throttle shaft 12 preferably extends through a first portion 24a of the bore 24 such that a clearance 38 is present between the bore first portion 24a and the throttle shaft 12. The clearance 38 is preferably of any appropriate size in order to substantially reduce or eliminate frictional contact between the shaft 12 and the bore 24. In order to permit rotational movement between the throttle shaft 12 and the housing 16, the bearing 26 preferably includes an inner race 40 coupled with the throttle shaft 12 and an outer race 42 coupled with the housing 16. The inner race 40 and the outer race 42 are preferably separated by low-friction rolling members, such as the ball bearings 44 shown in FIG. 2.

As discussed above, it is desirable to prevent longitudinal movement of the throttle shaft 12 (where longitudinal motion is defined as being generally parallel to the rotational axis 30 shown in FIG. 1). Therefore, an end float control mechanism is preferably provided. FIG. 2 shows a close-up view of one embodiment of a deformable member 36 utilized in the present invention for float control that is coupled with the bearing 26 and the shaft 12. The deformable member 36 shown in FIG. 2 is referred to as a crush ring 36 and has a generally-circular ring shape, but other configurations may be used.

As discussed above, it is undesirable if deformation to the throttle shaft 12 occurs during assembly and maintenance of the throttle body 10. Therefore, in the present invention the inner race 40 is coupled to the throttle shaft 12 via the crush ring 36. More specifically, the crush ring 36 is located between the throttle shaft 12 and an inner surface 44 of the inner race 40 in order to form a press-fit connection. The press-fit connection between the crush ring 36, the throttle shaft 12, and the bearing 26 is strong enough to substantially prevent movement between the throttle shaft 12 and the bearing 26 in the longitudinal direction. More specifically, the crush ring 36 is plastically deformed by the press-fit connection between the bearing inner race 40 and the throttle shaft 12.

In order to substantially prevent contact between the inner race 40 of the bearing 26 and the throttle shaft 12, a clearance 46 exists between the inner race 40 and the throttle shaft 12. The clearance 46 is any amount sufficient to prevent contact between the inner face 40 and, the throttle shaft 12.

The throttle shaft 12 preferably includes a portion having a reduced diameter, such as the groove 48 shown in FIG. 2. The crush ring 36 is located within the groove 48 in order to properly position the crush ring 36 on the throttle shaft 12 with respect to the bearing 26 during assembly and maintenance of the throttle body 10. The groove 48 in FIG. 2 has a shape such as to matingly receive the crush ring 36.

The outer race 42 preferably forms a press-fit connection with a second surface 24b of the bore 24 in order to substantially prevent longitudinal movement between the outer race 42 and the housing 16.

Referring now to FIGS. 3a and 3b, in one configuration the crush ring 36 is a generally-circular ring that substantially encircles the throttle shaft 12. In order for the crush ring 36 to effectively plastically deform when forming a press-fit connection with the throttle shaft 12 and the bearing inner race 40, the material of the crush ring 36 is preferably a relatively soft metal such as aluminum, but any appropriate material may be used.

The configuration shown in FIGS. 3a and 3b includes a tapered end portion 50, having a tapered portion diameter 52, and a straight portion 54, having a straight portion diameter 56. The tapered portion 50 preferably extends across a length $L_1$ parallel to the rotational axis 30 at an angle ρ with respect to a line parallel with the rotational axis 30. The tapered portion diameter 52 varies across the length $L_1$ of the tapered portion 50, while the straight portion diameter 56 is substantially constant. The length $L_1$ of the tapered portion 50 is approximately one-third of the total length $L_2$ of the crush ring 36, but any appropriate length may be used. The angle φ of the tapered portion 50 is preferably within a range of 5°-45°, but again, any appropriate angle may be used. In order to improve the method of assembly of the throttle body 10, the tapered portion 50 is located adjacent to a lead end of the crush ring 36, as will be discussed in further detail below.

The crush ring 36 includes a slot 58 extending through the crush ring 36 such that the respective diameters 52, 56 of the crush ring 36 are variable. The variable diameters 52, 56 allow the crush ring 36 to be expanded during installation onto the shaft 12 and deform upon press-fitting of the bearing 26, as will be discussed in further detail below. In order to minimize high-pressure contact points between the bearing inner race 40 and the crush ring 36, the slot 58 preferably extends along the length L of the crush ring 36 at an angle substantially oblique to the rotational axis 30. More preferably, the slot 58 forms an angle θ of 15°-60° with the rotational axis 30. Even more preferably, the slot forms an angle θ of approximately 30° with the rotational axis 30. As shown in FIG. 3b, the crush ring 36 in the undeformed state includes a minimum thickness 60 in the tapered portion 50 and a maximum thickness 62 in the straight portion 54.

Referring now to FIG. 4, the details of a method of assembly of a throttle body embodying principles of the present invention will now be discussed. The crush ring 36 is located in the groove 48 of the throttle shaft 12 such as to extend substantially around the throttle shaft 12. In one configuration, the crush ring 36 is located around the shaft by expanding the diameter of a pre-formed crush ring until the slot fits over the throttle shaft 12. In another configuration, a generally flat blank of material is wrapped around the groove of the shaft in order to form a substantially continuous ring. In yet another configuration, the crush ring is a continuous ring that is formed, such as by a molding process, while the blank material is around the throttle shaft. In another configuration, the crush ring is a preformed continuous crush ring that is moved down the length of the throttle shaft into a desired position, such as into a groove in the throttle shaft. In this configuration, the diameter of the pre-formed continuous crush ring may be reduced once the crush ring is in the desired position.

After the crush ring 36 has been inserted into the groove 48 and before it has been deformed, the crush ring 36 preferably has a space to expand in the longitudinal direction as it contracts in the radial direction. More specifically, at least one gap 64 is formed between the crush ring 36, a longitudinal end 66 of the crush ring 36, and a respective side wall 68 of the groove 48. The crush ring 36 shown in FIG. 4 is substantially centered within the groove 48 such that the gap 64 is present on each longitudinal end 66 of the crush ring 36.

Referring back to FIG. 2, once the crush ring 36 has been inserted into the groove 48, the throttle shaft 12 is inserted into the bearing 26. During insertion of the throttle shaft 12 into the bearing 26, the crush ring 36 is inserted into the bearing 26 forming a press-fit connection and substantially preventing longitudinal movement between the throttle shaft 12 and the bearing 26 along the rotational axis 30. In order ease the insertion into the bearing 26, the crush ring 36 is preferably inserted into the bearing 26 such that the tapered portion 50 is the lead portion of the crush ring 36 entering the bearing 26.

During insertion of the crush ring 36 and the throttle shaft 12 into the bearing 26, the crush ring 36 is radially compressed to a deformed thickness 72, which is less than the maximum thickness 62 of the undeformed crush ring 36. Depending on the amount of radial deformation that the crush ring 36 undergoes, the tapered portion 50 may be completely compressed such that the crush ring 36 has a substantially constant thickness. Alternatively, a portion of the tapered portion 50 remains undeformed and tapered after insertion into the bearing 26, as shown in FIG. 2. The crush ring 36 preferably expands in the longitudinal direction such as to engage the side walls 68 of the groove 48. The engagement between the crush ring 36 and the groove 48 substantially prevents movement between the throttle shaft 12, the crush ring 36, and the bearing 26.

As discussed above, the clearance 46 between the throttle shaft 12 and the bearing inner race 40 substantially prevents deformation of the throttle shaft 12 during insertion of the crush ring 36 into the bearing 26. Furthermore, the deformation of the crush ring 36 is preferably a plastic deformation in order to form a more effective press-fit connection.

Also during insertion of the crush ring 36 and the throttle shaft 12, a press-fit connection is formed between the outer race 42 of the bearing 26 and the housing 16. The outer race 42 and the housing 16 also preferably form a substantially fluid-tight connection to prevent the airflow 18 from entering the bore 21 formed by the first surface 20 of the housing 16. Similarly, the bearing inner and outer races 40, 42 and the ball bearings 44 also preferably form a substantially fluid-tight connection.

Figure 5:
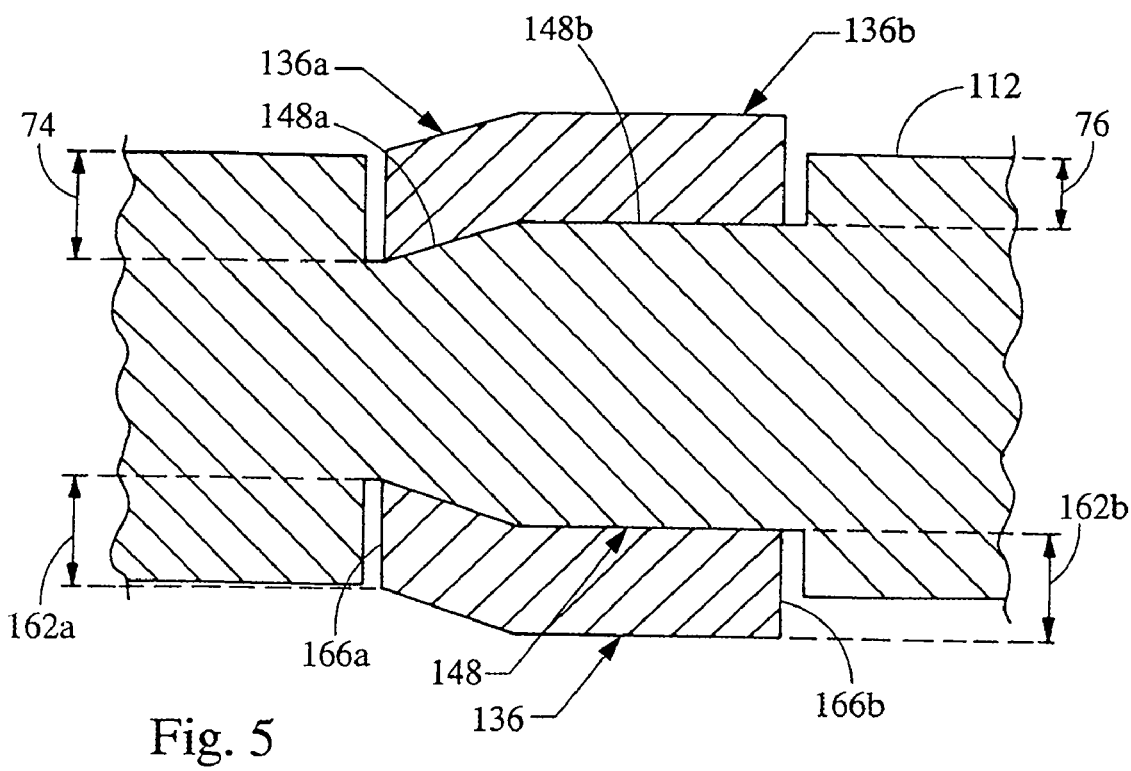
FIG. 5 is a throttle shaft and a deformable member of a second preferred embodiment of the present invention.

Referring now to FIG. 5, an alternative configuration of a throttle body embodying the principles of the present invention will now be discussed. The throttle shaft 112 shown in FIG. 5 includes a groove 148 having a varying depth. More specifically, the groove 148 includes a tapered portion 148*a* having a varying groove depth 74 and a straight portion 148*b* having a constant groove depth 76. The tapered portion 148*a* preferably has a length of approximately one third of the length of the groove 148. Additionally, the tapered portion 148 extends along its length at an angle of 5°-45°, but any appropriate angle may be used. In order to improve the method of assembly of the throttle body, the tapered portion 148*a* is preferably located adjacent to an end of the groove 148.

The deformable member 136 in this configuration is preferably a crush ring 136 having a substantially constant thickness across its length. More specifically, the first longitudinal end 166*a* of the crush ring 136 has a thickness 162*a* and the second longitudinal end 166*b* of the crush ring 136 has a thickness that is substantially equal to the thickness 162*a*. As a result of the substantially constant thickness and a generally flush connection between the crush ring 136 and the throttle shaft 112, the crush ring 136 effectively has a tapered portion 136*a* corresponding to the groove tapered portion 148*a* and a straight portion 136*b* corresponding to the groove straight portion 148*b*. The crush ring tapered portion 136*a* eases insertion of the crush ring 136 into the bearing 26, similarly to that discussed above with another configuration.

Figure 6:
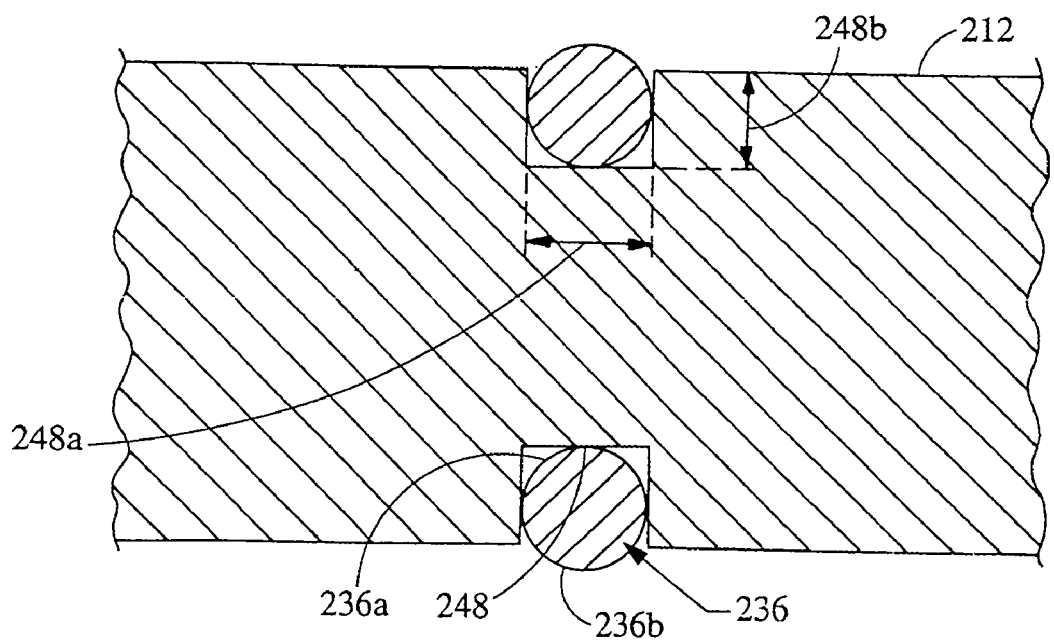
FIG. 6 is a throttle shaft and a deformable member of a third preferred embodiment of the present invention.

Referring now to FIG. 6, yet another alternative configuration of a throttle body embodying the principles of the present invention will now be discussed. The throttle shaft 212 shown in FIG. 6 includes a groove 248 having a groove width 248*a* and a groove depth 248*b*. Furthermore, a deformable member 236 is referred to as a crush ring 236 located within the groove 248. The crush ring 236 has a generally circular cross-section, but other configurations may be used. A portion 236*a* of the crush ring 236 is located within the groove 248 and a portion 236*b* of the crush ring 236 extends outside of the groove 248 in order to be deformed by the press-fit connection with the bearing during assembly.

The diameter of the crush ring 236 is preferably substantially equal to the groove width 248*a* such that the crush ring 236 is substantially secured within the groove 248 during assembly. Furthermore, the groove 248 preferably has generally squared corners such that gaps exist between the respective groove corners and the crush ring 236. Thus, the crush ring 236 is able to expand into the gaps during deformation. Due to the groove width 248*a* being substantially equal to the diameter of the crush ring 236, the groove depth 248*b* is preferably smaller than the groove width 248*a* such that the portion 236*b* extends outside of the groove 248.

The crush ring 236 is preferably comprised of a wire, such as an aluminum wire. Similar to the tapered section discussed above, the arcuate shape of the portion 236*b* of the crush ring 236 extending outside of the groove 248 eases insertion of the crush ring 236 into the bearing.

Alternative configurations of the throttle body discussed above may be used with the present invention. For example, the deformable member may comprise a plurality of components located at various points around the throttle shaft.

Figure 7A:
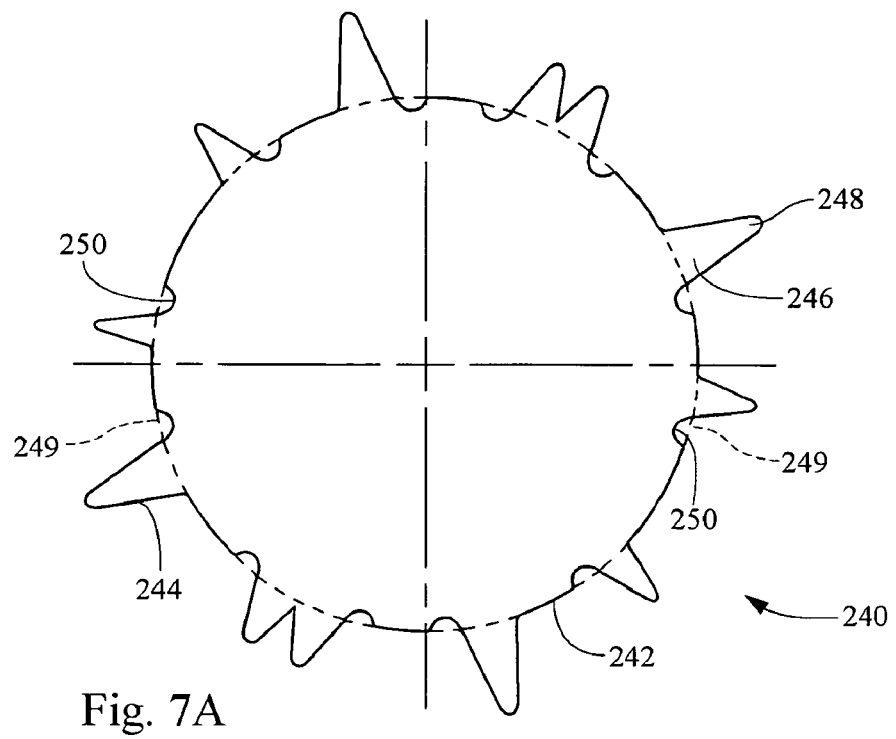
FIG. 7a is an axial view of a throttle shaft according to a fourth preferred embodiment of the present invention.
Figure 7B:
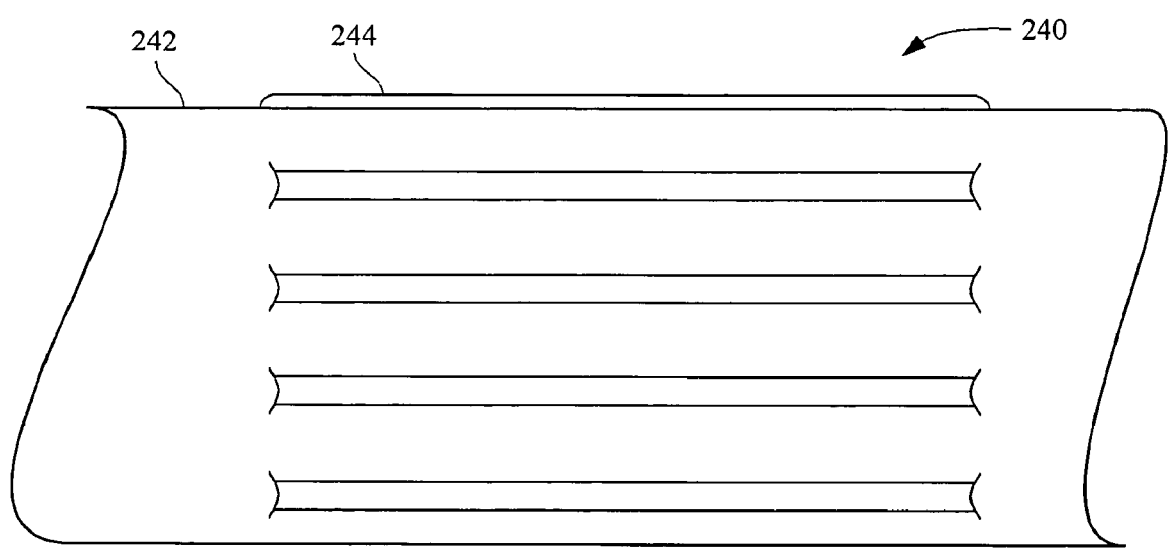
FIG. 7b is a side view of a throttle shaft according to the fourth preferred embodiment of the present invention.

FIGS. 7*a* and 7*b* illustrate a throttle shaft according to a fourth preferred embodiment. The throttle shaft 240, shown in FIGS. 7*a* and 7*b*, includes an elongated tubular member 242 having a plurality of protruding splines 244 that are integrally formed with the elongated tubular member 242. The protruding splines 244 extend axially along the exterior surface of the elongated tubular member 242 and are substantially parallel to one another. In addition, the protruding splines 244 also extend radially outward from the elongated tubular member 242. Preferably, there are 4-12 protruding splines formed about the circumference of the throttle shaft 240; however, more or less splines may be used depending on the diameter of the throttle shaft 240.

Since the protruding splines 244 are integral to the tubular member 242, the protruding splines 244 are formed from a same material as the tubular member 242 (i.e., such as steel). As a result, the protruding splines 244 include both elastic deformation properties and plastic deformation properties. Each of the protruding splines 244 include a base section 246 that tapers as it extends radially outward to a top section 248.

Figure 8:
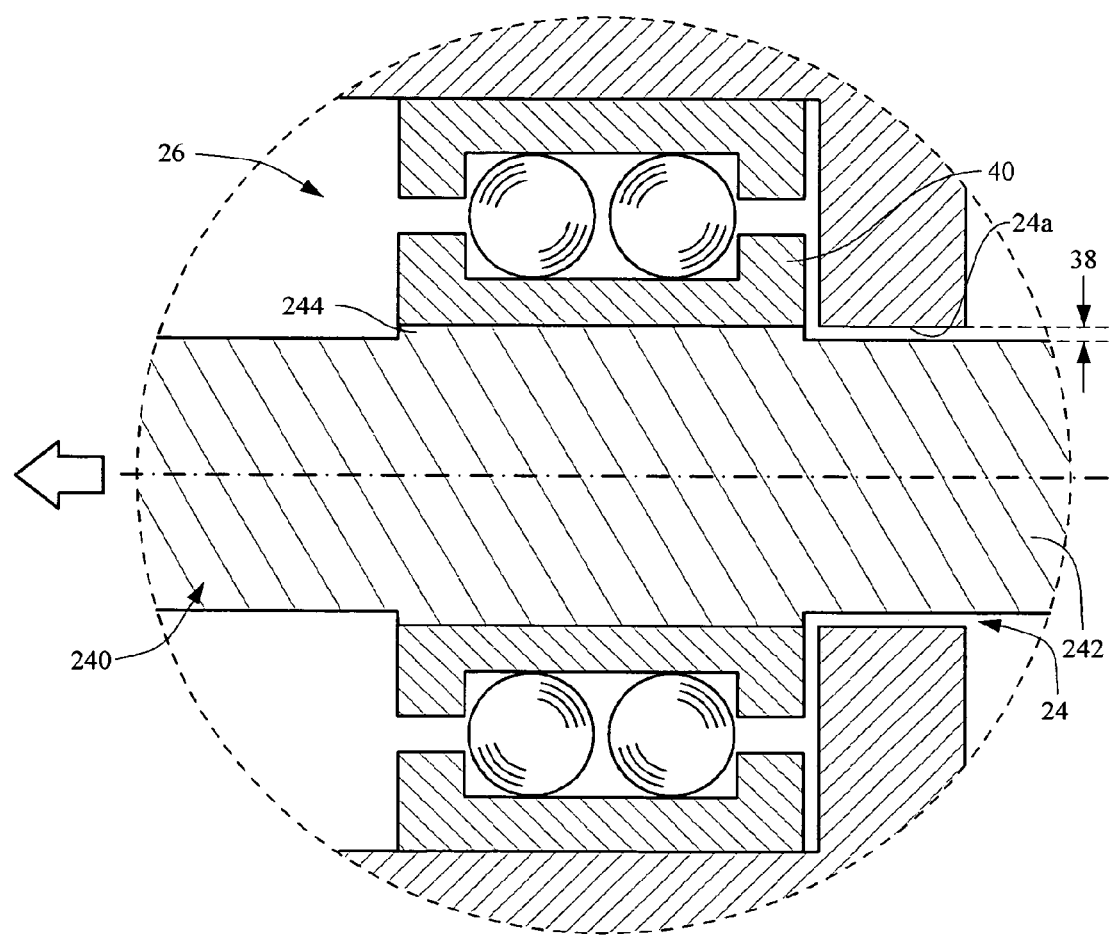
FIG. 8 is a partial cross-section view of the throttle shaft and bearing according to the fourth preferred embodiment of the present invention.

FIG. 8 illustrates throttle shaft 240 extending through the first portion 24*a* of the bore 24. Similar to FIG. 7*b*, a clearance 38 is present between the bore first portion 24*a* and the throttle shaft 240. The clearance 38 is of the appropriate size in order to substantially reduce or eliminate frictional contact between the throttle shaft 240 and the bore 24.

The inner race 40 of the bearing 26 is coupled to the throttle shaft 240 via the protruding splines 244 which are integrally formed on the throttle shaft 240. The protruding splines 244 extend axially along the throttle shaft 240 for a distance that is at least equal to a width of the inner race 40 of the bearing 26. The press-fit connection between the protruding splines 244 of the throttle shaft 240 and the bearing 26 is strong enough to substantially prevent movement between the throttle shaft 240 and the bearing 26 in the longitudinal direction. More specifically, the protruding splines 244 are both plastically deformed and elastically deformed by the press-fit connection between the bearing inner race 40 and the throttle shaft 240. That is, a substantial portion of the base section 246 is elastically deformed while a substantial portion of the top section 248 is plastically deformed. The combined deformation properties of the base section 246 and the top section 248 are strong enough to cooperatively retain the throttle shaft 240 to the bearing 26.

The elastic deformation properties of the bottom section 246 allow the throttle shaft 240 to be removed from the bearing 26 (e.g., for service) and to be re-inserted while retaining an adequate press-fit retention force to maintain the coupling between the throttle shaft 240 and the bearing 26. Furthermore, as the protruding splines 244 are deformed, the top section 248 of each respective spline deforms circumferentially as opposed to axially so that substantially no deformed material from the protruding splines 244 displaces into the clearance 38.

The protruding splines 244 of the throttle shaft 240 are formed just prior to inserting the throttle shaft 240 into the bearing 26. Prior to the formation of the protruding splines 244, the tubular member 242 includes an exterior surface having a uniform diameter, as shown at 249 in FIG. 7*a*. After the protruding splines 244 are formed, the exterior surface of the tubular member 242 includes a roughly formed exterior surface in which the diameter may be non-uniform, as shown at 250 in FIG. 7*a*, as a result of the forming operation.

Figure 9:
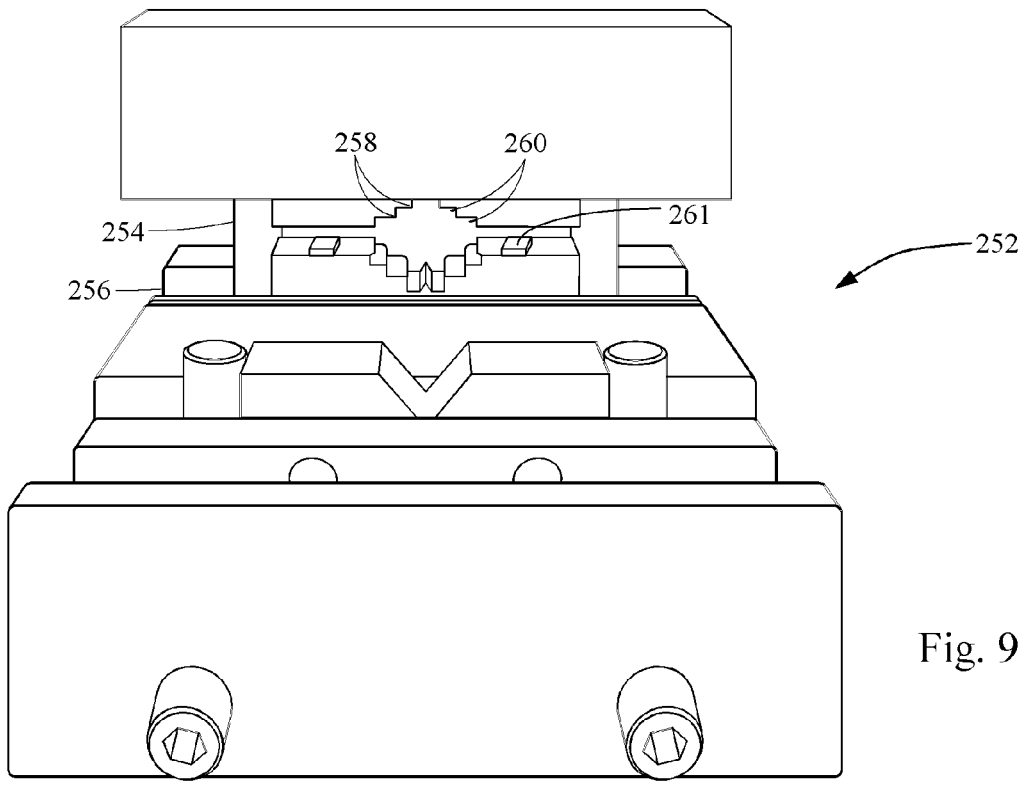
FIG. 9 is perspective view of a tool used to form the splines of the throttle shaft according the fourth preferred embodiment of the present invention.

FIG. 9 illustrates a forming tool 252 used to form the protruding splines 244 of the throttle shaft 240. The forming tool 252 includes a split die having a first die half 254 and a second die half 256. The first die half 254 and the second die half 256 each include a plurality of contact points 258 which are used to swage or cold form the exterior surface of the tubular member 242. The first die half 254 and the second die half 256 are brought into contact with the tubular member 242 for compressing the shaft from two sides. The plurality of contact points 258 compress the exterior surface of the tubular member 242 thereby decreasing the diameter of the tubular member 242. Uncompressed regions 260 between the plurality of contact points 258 receive displaced material from the tubular shaft 242 as a result of the compression force exerted thereon. The displaced material of the tubular member 242 is forced circumferentially to the uncompressed regions 260 adjacent the plurality of contact points 258. As the displaced material is forced to the uncompressed regions 260, the displaced material extends radially outward from the exterior surface of the tubular member 242 thereby forming the plurality of protruding members 244. The displaced material is substantially unrestricted, with the exception of a respective wall surfaces of the contact points of the forming tool, as it flows into the uncompressed regions 260, and as a result, the height and width of each of the plurality of protruding members 244 may vary. Furthermore, the forming tool 252 may include hard stops, shown generally at 261, to limit the amount of travel of a respective die half and the amount of compression force exerted on the tubular member 242.

As shown in FIG. 7a, the diameter of the exterior surface, shown generally at 250, decreases as a result of the compression applied by the forming tool 252. The compressed exterior surface 250 may include an uneven surface as a result of the roughly forced compression operation. However, the uneven compressed exterior surface of the tubular member 242 does not factor into the press-fit operation since the throttle shaft 240 utilizes only the protruding splines 244 as a mating surface for the interference fit with the inner race of the bearing 26 shown in FIG. 9.

After the protruding splines 244 are formed, the throttle shaft 240 is press-fit into each respective bearing. The forming operation of the protruding splines 244 is performed immediately before the throttle shaft 240 is assembled into each respective bearing. As a result, the insertion force required to press-fit the throttle shaft 240 into the respective bearing is utilized as a control parameter for forming the protruding splines 244. That is, if a respective throttle shaft having protruding splines are identical (i.e., having equal dimensions), a same predetermined force could be used to press-fit each respective throttle shaft in the respective bearings. Typically, sub-components are formed in mass batches and are then supplied to an assembly operation to be assembled in a respective component. Since forming tools typically have gradual wear rates as components are produced, SPC measurement data is collected on the mass production parts at predetermined time or count intervals for verifying that the dimensional characteristics are within their respective tolerances (e.g., height and width, taper).

In the preferred embodiment, dimensional data on the protruding splines 244 is not measured and collected. Rather, the adjustments to the forming tool 252 are gauged on the force required to insert the throttle shaft 240 into the respective bearings at the preceding assembly operation. Based on the force required to press-fit the throttle shaft 240 into the bearing 26, required adjustments may be immediately made to the forming tool at the previous operation. For example, as the forming tool wears, a same applied compression force exerted by the forming tool on the tubular member to form the protruding splines would result in less material being forced to the uncompressed regions, which in turn, results in a decrease in the height of the protruding splines. A decrease in the height of the protruding splines 244 results in a lower press-in force required to insert a respective throttle shaft into a respective bearing since there is less material to deform when press-fitting the respective throttle shaft into the respective bearing. The force required to insert the throttle shaft 240 is directly related to the height and width of the protruding splines 244. If the force required to the insert the throttle shaft decreases, then the height and width of the protruding splines 244 have decreased. Adjustments may be made to the forming tool 252 to increase the compression force exerted on the exterior surface of the throttle shaft 240 for displacing additional material into the uncompressed regions 260 which will increase the height of the protruding splines 244. Since the protruding splines 244 for a respective throttle shaft is formed immediately preceding the assembly of the respective throttle shaft into the respective bearings, direct feedback of the insertion force is used to monitor the formation of the protruding splines 244 without having to measure the height and width of each protruding spline for maintaining design tolerances. The protruding splines 244 may be roughly and non-uniformly formed and adjustments may be directly made to the forming tool 252 for producing the protruding splines 244 based on the required force to insert the throttle shaft 240 into the bearing 26. This reduces scrap and manufacturing cost as a result of not having to maintain tight design tolerances or producing stockpiles of formed throttle shafts that are later determined to be out of specification.

Figure 10:
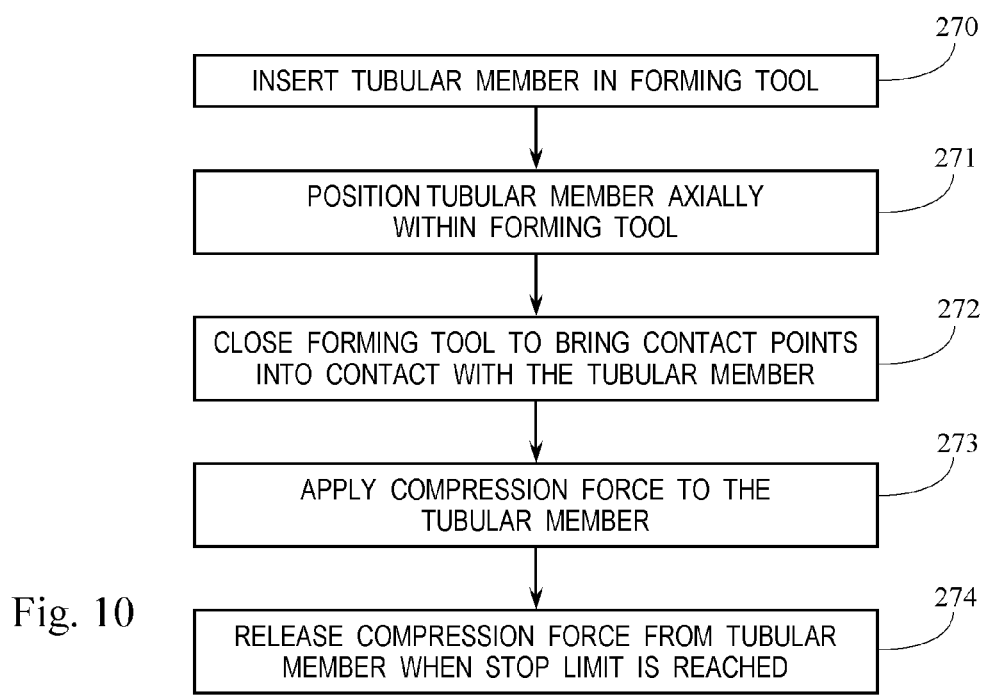
FIG. 10 is a method for forming the splines of the throttle shaft according to the fourth preferred embodiment of the present invention.

FIG. 10 illustrates a method for forming the protruding splines on the throttle shaft. In step 270, the tubular member is placed in the forming tool. In step 271, the tubular member is located axially and radially by hard points. In step 272, the forming tool is brought into contact with the tubular member. In step 273, a compression force is exerted on the tubular member by the contact points of the forming tool. Material from the tubular member is displaced adjacent to the uncompressed regions adjacent contact points of the forming tool for forming the plurality of splines as a result of the compression force exerted by the contact points. In step 274, hard stops limit the travel distance of the forming tool. This in turn limits the amount of compression exerted on the tubular member, and hence, overall height of the plurality of splines.

It is therefore intended that the foregoing detailed description be regarded as illustrative rather than limiting, and that it be understood that it is the following claims, including all equivalents, that are intended to define the spirit and scope of this invention.

What is claimed is:

1. A method of forming a throttle shaft for a throttle body of an automobile, said method comprising the steps of:
providing a shaft member defining a rotational axis;
providing a forming tool having a split die having a plurality of contact points and uncompressed regions;
inserting said shaft member in said forming tool;
compressing said forming tool against said shaft member for displacing material to said uncompressed regions for forming a plurality of protruding splines;
press-fitting said shaft member into a bearing of said throttle body;
measuring a press-fit force applied to said shaft member for inserting said shaft member into said bearing;
providing feedback indicative of said press-fit force applied to said shaft member; and
adjusting said compression force of said forming tool applied to said shaft member in response to said feedback.

2. The method of claim 1 wherein said forming tool forms said plurality of splines of at least a minimum axial length.

3. The method of claim 1 wherein said forming tool applies a predetermined compression force to said shaft member for forming said plurality of protruding splines.

4. The method of claim 1 wherein said step of compressing said forming tool is restricted by hard stops mounted to said forming tool, said hard stops limiting a travel of said forming tool.

* * * * *